United States Patent
Williamson

(10) Patent No.: US 12,447,954 B2
(45) Date of Patent: Oct. 21, 2025

(54) METHOD AND APPARATUS FOR ENHANCED LANE LINE ATTRIBUTION

(71) Applicant: HERE GLOBAL B.V., Eindhoven (NL)

(72) Inventor: D Scott Williamson, Wheaton, IL (US)

(73) Assignee: HERE GLOBAL B.V., Eindhoven (NL)

( * ) Notice: Subject to any disclaimer, the term of this patent is extended or adjusted under 35 U.S.C. 154(b) by 280 days.

(21) Appl. No.: 18/045,206

(22) Filed: Oct. 10, 2022

(65) Prior Publication Data

US 2024/0116505 A1 Apr. 11, 2024

(51) Int. Cl.
*G01C 21/36* (2006.01)
*B60W 30/10* (2006.01)
*G01C 21/00* (2006.01)
*G06V 20/56* (2022.01)

(52) U.S. Cl.
CPC ......... *B60W 30/10* (2013.01); *G01C 21/3602* (2013.01); *G01C 21/3658* (2013.01); *G01C 21/3822* (2020.08); *G01C 21/3848* (2020.08); *G06V 20/588* (2022.01); *B60W 2420/403* (2013.01); *B60W 2552/53* (2020.02); *B60W 2556/40* (2020.02); *B60W 2556/50* (2020.02)

(58) Field of Classification Search
CPC .... G06V 20/598; G06V 20/588; G01C 21/00; G01C 21/3602; G01C 21/3658; G01C 21/3848; G05D 1/244; G05D 1/0231; G05D 1/0234; G05D 1/0246

See application file for complete search history.

(56) References Cited

U.S. PATENT DOCUMENTS

| | | | | |
|---|---|---|---|---|
| 8,600,673 | B2* | 12/2013 | Nakamura | G08G 1/167 701/25 |
| 12,165,422 | B2* | 12/2024 | Aizawa | G06V 20/588 |
| 2009/0245582 | A1* | 10/2009 | Sakamoto | G06V 10/56 348/148 |

(Continued)

FOREIGN PATENT DOCUMENTS

| | | |
|---|---|---|
| EP | 2518446 A1 | 10/2012 |
| WO | WO 2020/243484 A1 | 12/2020 |

OTHER PUBLICATIONS

Choi et al., "In-Lane Localization and Ego-Lane Identification Method Based on Highway Lane Endpoints", Journal of Advanced Transportation vol. 2020, (Feb. 1, 2020), 16 pages.

*Primary Examiner* — Dino Kujundzic
(74) *Attorney, Agent, or Firm* — ALSTON & BIRD LLP

(57) ABSTRACT

A method, apparatus and computer program product are provided for generating lane line attributions for point locations along a road boundary for use in localization, map building, and map healing. Methods may include: receiving a sequence of geospatial observations from a vehicle traveling along a road segment; identifying, within the sequence of geospatial observations, lane line marking observations; determining, from the lane line marking observations, discrete points along the lane line markings, where the discrete points along the lane line markings include end points of a respective lane line marking; establishing a location of the vehicle based, at least in part, on the discrete points along the lane line markings; and providing for at least one of navigational assistance or at least semi-autonomous vehicle control based on the location established.

20 Claims, 6 Drawing Sheets

(56) References Cited

U.S. PATENT DOCUMENTS

| | | | |
|---|---|---|---|
| 2013/0028473 A1* | 1/2013 | Hilldore | G06V 20/56 |
| | | | 382/103 |
| 2016/0162740 A1* | 6/2016 | Takemura | G06V 20/56 |
| | | | 348/148 |
| 2016/0307054 A1* | 10/2016 | Takemura | H04N 23/811 |
| 2018/0129887 A1* | 5/2018 | Kang | G06T 7/70 |
| 2018/0188037 A1* | 7/2018 | Wheeler | G06V 20/582 |
| 2020/0020104 A1 | 1/2020 | Mittal et al. | |
| 2020/0247431 A1* | 8/2020 | Ferencz | G01C 21/3407 |
| 2020/0292323 A1* | 9/2020 | Rabel | G01C 21/32 |
| 2020/0292330 A1 | 9/2020 | Rabel et al. | |
| 2020/0393265 A1 | 12/2020 | Piao et al. | |
| 2021/0182596 A1* | 6/2021 | Adams | G06V 20/588 |
| 2022/0082403 A1* | 3/2022 | Shapira | G06V 20/58 |
| 2022/0254170 A1* | 8/2022 | Kagimoto | G08G 1/16 |

* cited by examiner

| Point | Location | | Attribution |
|---|---|---|---|
| | Lat. | Long. | |
| 212 | 51.1789N | 1.8262W | Beginning of lane line marking |
| 214 | 51.1790N | 1.8262W | End of lane line marking |
| 216 | 51.1801N | 1.8258W | End of lane line marking |
| 218 | 51.1803N | 1.8258W | Beginning of lane line marking |
| 220 | 51.1793N | 1.8262W | On lane line marking |
| 222 | 51.1800N | 1.8262W | Between lane line markings |

FIG. 4

METHOD AND APPARATUS FOR ENHANCED LANE LINE ATTRIBUTION

TECHNOLOGICAL FIELD

Example embodiments of the present invention relate generally to the enhancement of lane line attributions of lane lines along a road segment, and more particularly, to generate lane line attributions for point locations along a road boundary for use in localization, map building, and map healing.

BACKGROUND

Road geometry modelling is very useful for high-definition (HD) map creation and terrain identification along with feature and obstacle detection in environments, each of which may facilitate autonomous vehicle navigation along a prescribed path. Traditional methods for 3D modelling of road geometry and object or feature detection are resource intensive, often requiring significant amounts of human measurement and calculation. Such methods are thus time consuming and costly. Exacerbating this issue is the fact that many modern-day applications (e.g., 3D mapping, terrain identification, or the like) require manual or semi-automated analysis of large amounts of data, and therefore are not practical without quicker or less costly techniques.

Some current methods of map data generation rely upon feature detection from sensor data collected by vehicles traveling within an environment. Feature detection generally includes a determination of discrete objects at point locations and continuous objects that include features such as road boundaries. These features can be beneficial to modelling of road geometry, particularly when both discrete and continuous features are available. However, in certain circumstances discrete and/or continuous features may be sufficiently sparse that road geometry modelling is challenging.

BRIEF SUMMARY

Accordingly, a method, apparatus, and computer program product are provided for the enhancement of lane line attributions of lane lines along a road segment, and more particularly, to generate lane line attributions for point locations along a road boundary for use in localization, map building, and map healing. In an example embodiment, an apparatus is provided including at least one processor and at least one memory including computer program code, the at least one memory and the computer program code may be configured to, with the at least one processor, cause the apparatus to: receive a sequence of geospatial observations from a vehicle traveling along a road segment; identify, within the sequence of geospatial observations, lane line marking observations; determine, from the lane line marking observations, discrete points along lane line markings, where the discrete points along the lane line markings include end points of a respective lane line marking; establish a location of the vehicle based, at least in part, on the discrete points along the lane line markings; and provide for at least one of navigational assistance or at least semi-autonomous vehicle control based on the location established.

According to certain embodiments, the apparatus is further caused to ascribe attributes to each of the lane line marking observations, where the attributes include: beginning of lane line marking; end of lane line marking, on a lane line marking, and between lane line markings. The attributes of the beginning of the lane line marking and the end of the lane line marking are, in some embodiments, relative to a direction of travel of the vehicle. According to some embodiments, the sequence of geospatial observations includes a sequence of geo-referenced images from an image sensor.

According to some embodiments the apparatus is further caused to provide an indication of the discrete points along lane line markings to a map services provider for use in map generation and map updating. The apparatus of an example embodiment is further caused to generate a polyline extending along a lane line marking, where discrete points along the lane line marking are used as vertices of the polyline. The apparatus of an example embodiment is caused to: determine that at least some of the discrete points along the lane line markings fail to correspond with map data identifying the discrete points along the lane line markings; and provide an update to the map data to a map services provider in response to the at least some of the discrete points along the lane line markings failing to correspond with map data identifying the discrete points along the lane line markings.

Embodiments provided herein include a computer program product including at least one non-transitory computer-readable storage medium having computer-executable program code instructions stored therein, the computer-executable program code instructions including program code instructions to: receive a plurality of sequences of geospatial observations from vehicles traveling along a road segment; identify, within the sequences of geospatial observations, lane line marking observations; determine, from the lane line marking observations, discrete points along lane line markings, where the discrete points along the lane line markings include end points of a respective lane line marking; generate a polyline along the road segment based on the lane line marking observations; update a map database with the polyline representing the lane line marking observations including the discrete points along the lane line markings; and provide the discrete points along the lane line markings for localization of a vehicle along the road segment.

According to some embodiments, the discrete points along the lane line markings are vertices of the polyline. The computer program product of some embodiments includes program code instructions to ascribe attributes to the lane marking observations, where the attributes include: beginning of a lane line marking, end of a lane line marking, on a lane line marking, and between lane line markings. The attributes of the beginning of the lane line marking and the end of the lane line marking are, in some embodiments, relative to a direction of travel of the vehicles traveling along the road segment. According to certain embodiments, the sequences of geospatial observations include sequences of geo-referenced images from image sensors. According to certain embodiments, the computer program product includes program code instructions to provide an indication of the discrete points along lane line markings to a vehicle traveling along the road segment for at least one of navigational assistance or at least semi-autonomous vehicle control.

Embodiments provided herein include a method including: receiving a sequence of geospatial observations from a vehicle traveling along a road segment; identifying, within the sequence of geospatial observations, lane line marking observations; determining, from the lane line marking observations, discrete points along the lane line markings, where the discrete points along the lane line markings include end points of a respective lane line marking; establishing a location of the vehicle based, at least in part, on the discrete points along the lane line markings; and providing for at least one of navigational assistance or at least semi-autonomous vehicle control based on the location established.

The method of some embodiments includes ascribing attributes to each of the lane line marking observations, where the attributes include: beginning of lane line marking, end of lane line marking, on a lane line marking, and between lane line markings. The attributes of the beginning of the lane line marking and the end of the lane line marking are, in some embodiments, relative to a direction of travel of the vehicle. The sequence of geospatial observations includes, in some embodiments, a sequence of geo-referenced images from an image sensor.

The method of certain embodiments includes providing an indication of the discrete points along lane line markings to a map services provider for use in map generation and map updating. The method of an example embodiment includes generating a polyline extending along a lane line marking, where discrete points along the lane line marking are used as vertices of the polyline. The method of certain embodiments further includes: determining that at least some of the discrete points along the lane markings fail to correspond with map data identifying the discrete points along the lane line markings; and providing an update to the map data to a map services provider in response to the at least some of the discrete points along the lane line markings failing to correspond with map data identifying the discrete points along the lane line markings.

Embodiments provided herein include an apparatus including: means for receiving a sequence of geospatial observations from a vehicle traveling along a road segment; means for identifying, within the sequence of geospatial observations, lane line marking observations; means for determining, from the lane line marking observations, discrete points along the lane line markings, where the discrete points along the lane line markings include end points of a respective lane line marking; means for establishing a location of the vehicle based, at least in part, on the discrete points along the lane line markings; and means for providing for at least one of navigational assistance or at least semi-autonomous vehicle control based on the location established.

The apparatus of some embodiments includes means for ascribing attributes to each of the lane line marking observations, where the attributes include: beginning of lane line marking, end of lane line marking, on a lane line marking, and between lane line markings. The attributes of the beginning of the lane line marking and the end of the lane line marking are, in some embodiments, relative to a direction of travel of the vehicle. The sequence of geospatial observations includes, in some embodiments, a sequence of geo-referenced images from an image sensor.

The apparatus of certain embodiments includes means for providing an indication of the discrete points along lane line markings to a map services provider for use in map generation and map updating. The apparatus of an example embodiment includes means for generating a polyline extending along a lane line marking, where discrete points along the lane line marking are used as vertices of the polyline. The apparatus of certain embodiments further includes: means for determining that at least some of the discrete points along the lane markings fail to correspond with map data identifying the discrete points along the lane line markings; and means for providing an update to the map data to a map services provider in response to the at least some of the discrete points along the lane line markings failing to correspond with map data identifying the discrete points along the lane line markings.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
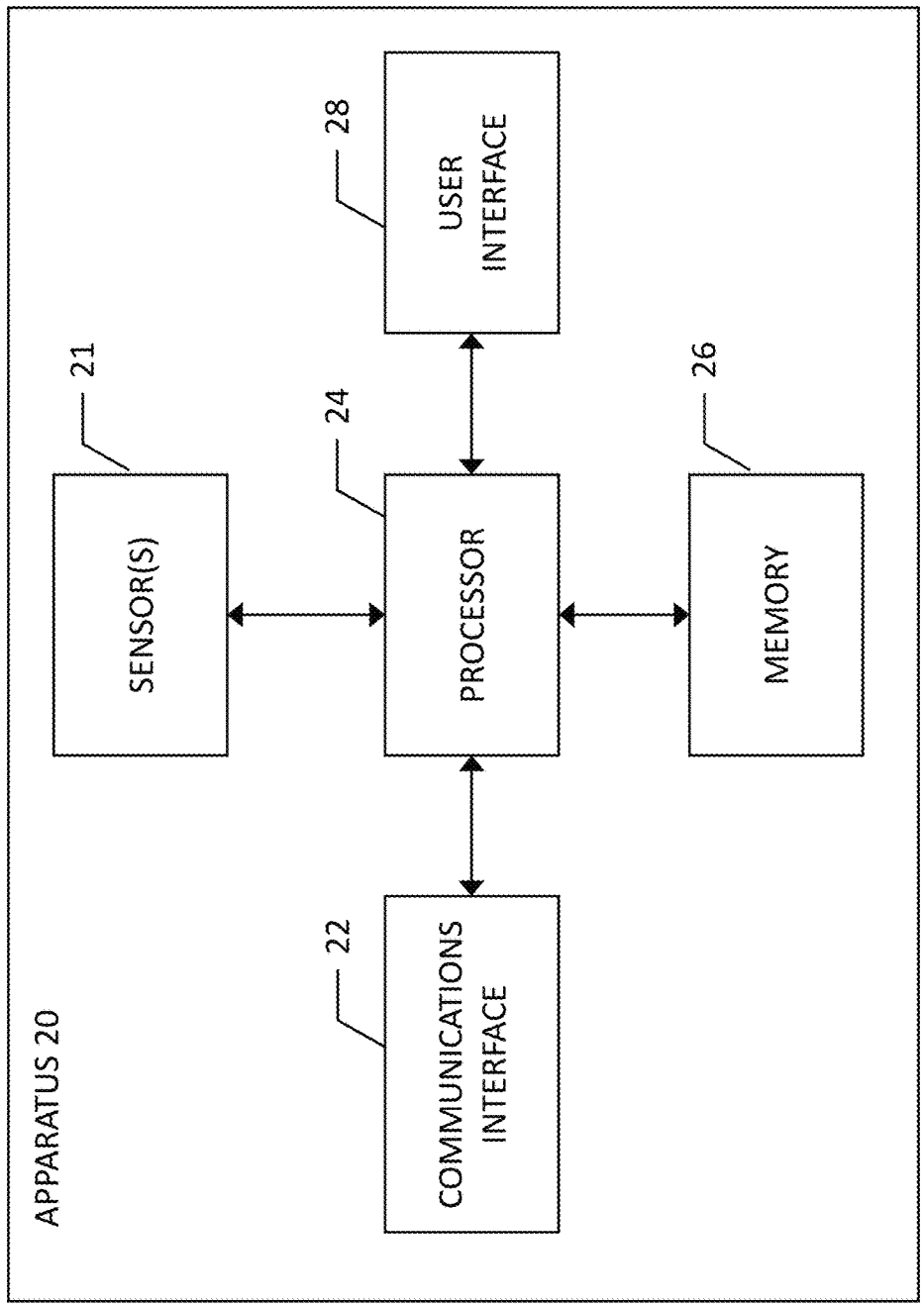
Figure 2:
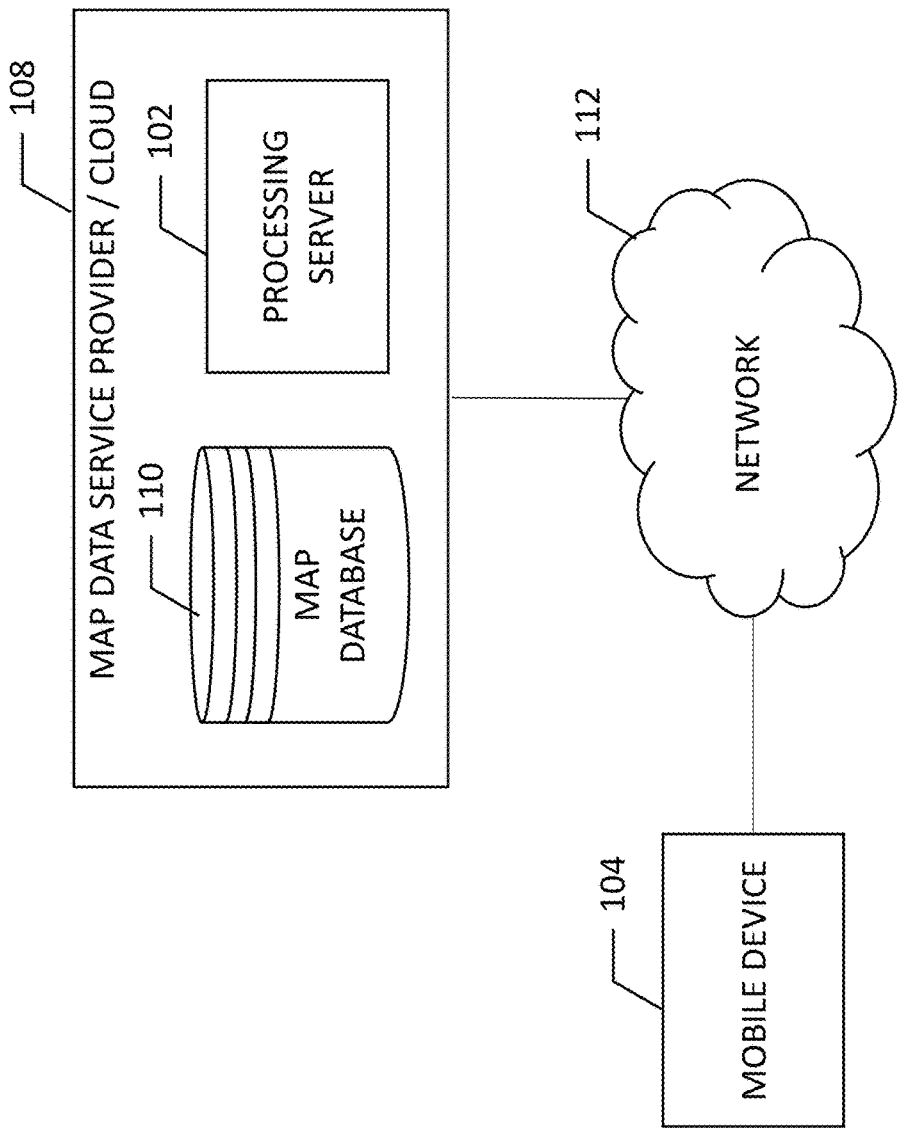
Figure 3:
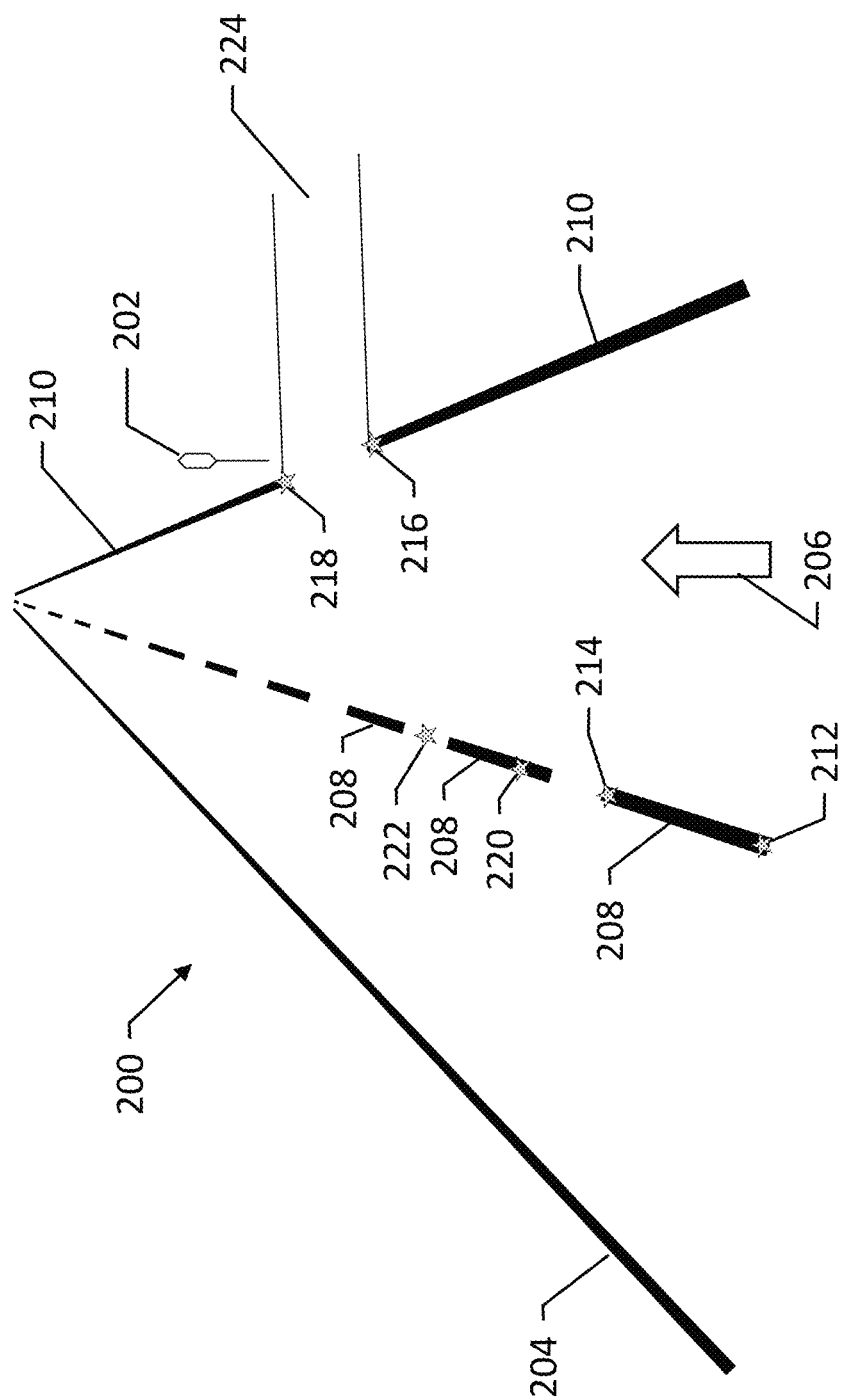
Figure 5:
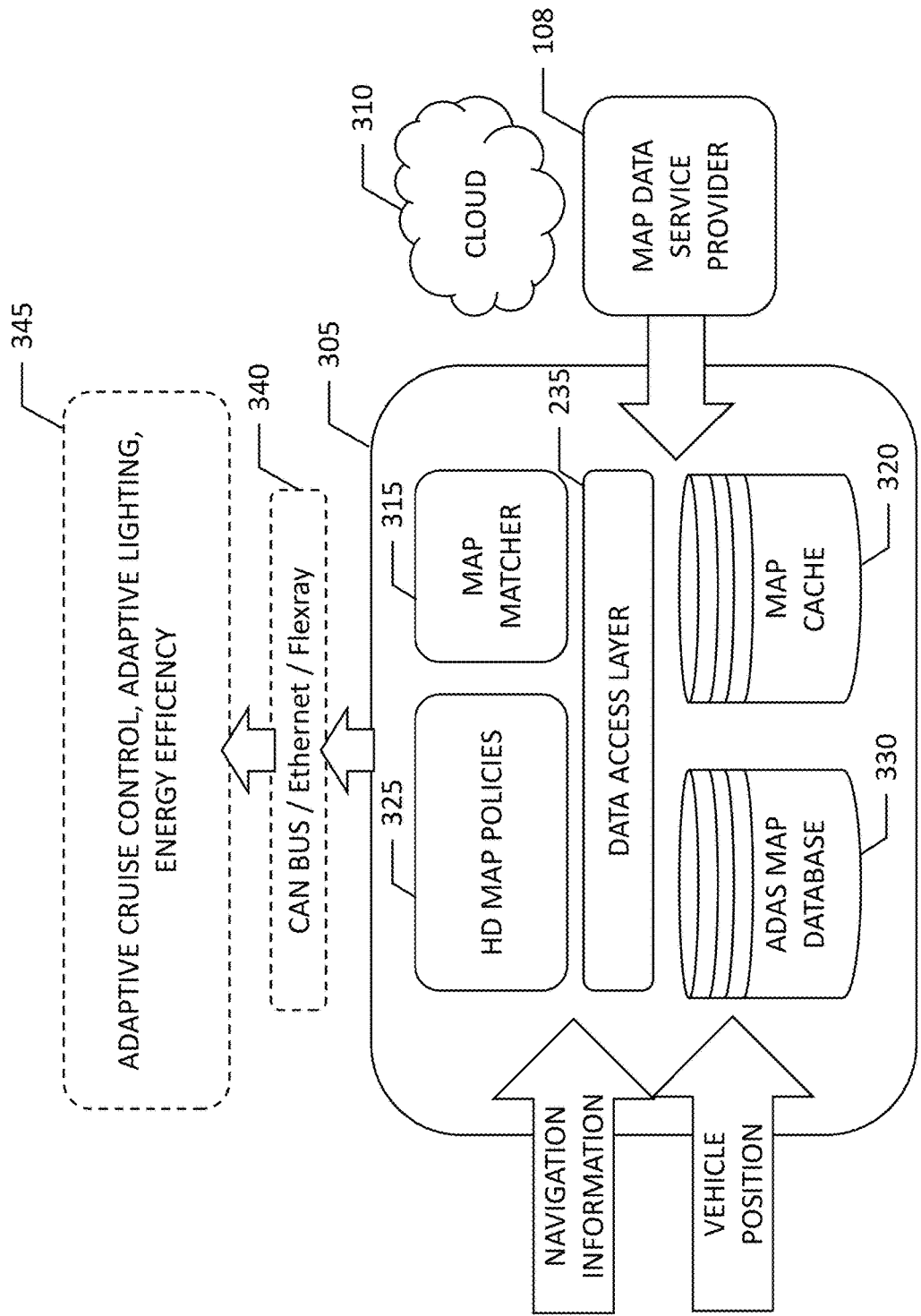
Figure 6:
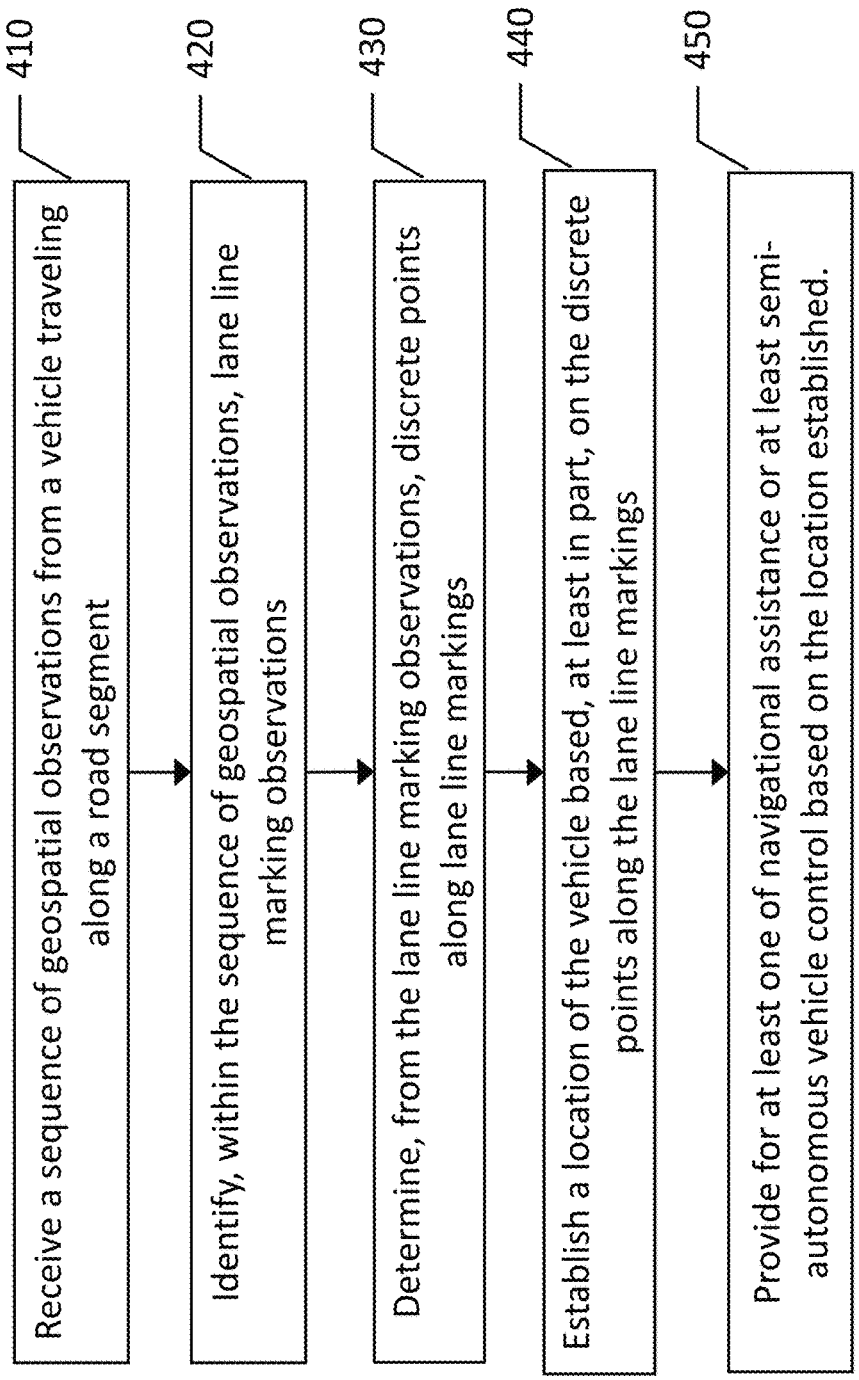

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present disclosure;

FIG. 2 is a block diagram of a system for generating lane line attributions for point locations along a road boundary for use in localization, map building, and map healing according to an example embodiment of the present disclosure;

FIG. 3 illustrates a road segment including continuous road features according to an example embodiment of the present disclosure;

FIG. 4 is a table of discrete points identified within the continuous features of the road segment of FIG. 3 according to an example embodiment of the present disclosure;

FIG. 5 is a block diagram of a system for implementing the methods described herein for generating lane line attributions for point locations along a road boundary for use in localization, map building, and map healing according to an example embodiment of the present disclosure; and FIG. 6 is a flowchart of operations for generating lane line attributions for point locations along a road boundary for use in localization, map building, and map healing according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present disclosure for the enhancement of lane line attributions of lane lines along a road segment, and more particularly, to generate lane line attributions for point locations along a road boundary for use in localization, map building, and map healing. Autonomous and semi-autonomous vehicles leverage sensor information relating to roads and objects and features proximate the roads to determine safe regions of a road to drive and to evaluate their surroundings as they traverse a road segment. Further, autonomous and semi-autonomous vehicles use high-definition map information to facilitate autonomous driving and to plan autonomous driving routes. These high-definition maps or HD maps are specifically designed and configured to facilitate autonomous and semi-autonomous vehicle control and may be able to replicate road segments virtually with the inclusion of accurately placed signs, road and lane boundaries, and other features or objects proximate a roadway.

HD maps have a high precision at resolutions that may be down to several centimeters that identify objects proximate a road segment, such as features of a road segment including lane widths, lane markings, traffic direction, speed limits, lane restrictions, etc. Autonomous and semi-autonomous vehicles use these HD maps to facilitate the autonomous control features, such as traveling within a lane of a road segment at a prescribed speed limit. Autonomous vehicles may also be equipped with a plurality of sensors to facilitate autonomous vehicle control. Sensors may include image sensors/cameras, Light Distancing and Ranging (LiDAR), Global Navigation Satellite Systems (GNSS) such as Global Positioning Systems (GPS), Galileo etc., Inertial Measurement Units (IMUs), or the like which may measure the surroundings of a vehicle and communicate information regarding the surroundings to a vehicle control module to process and adapt vehicle control accordingly.

Objects mapped within an HD map can further be used to enhance localization accuracy of vehicles, whether they include any degree of autonomy or not. Discrete objects such as signs, poles, or other objects that have a fixed, defined point location can be useful for localization with respect to latitude and longitude. Continuous objects, such as lane lines, curbing, guard rails, etc. are generally more useful for lateral positioning relative to a longitudinal extension of the continuous object. However, embodiments described herein discern features of continuous objects such as lane lines and employ traditionally continuous objects as discrete objects through the identification of discrete points along the continuous objects. Some roadways have few discrete objects to facilitate localization, such as highways, rural roads, and even roads between areas where discrete objects may be prevalent. These roadways generally have continuous features, such as lane lines including solid lane lines and dashed lane lines that embodiments of the present disclosure can use for localization through defining discrete points within the continuous features. While example embodiments described below discuss lane lines or lane markings and the detection thereof, embodiments described herein are applicable to any continuous objects extending along a road segment. Thus, features such as curbing, guard rails, road shoulders, and other continuous objects can be employed in the same manner as lane lines described below.

HD maps may be generated and updated based on sensor data from sensor-equipped vehicles traveling along road segments of a road network. These vehicles may have various degrees of autonomy and may be equipped with a variety of different levels of sensors. Sensors from fully autonomous vehicles, for example, may be used to update map data or generate new map data in a form of crowd-sourced data from vehicles traveling along road segments. Sensor data received can be aggregated with other sensor data relating to the data captured by sensors to establish the accuracy of sensor data and to confirm the position, size, shape, etc. of features and objects along the road segment.

Embodiments described herein broadly relate to identifying features in an environment of a road segment and defining locations of those features. An example embodiment of the present disclosure includes the identification of lane line features of a road segment, and generating attributions for points along the lane line(s) of a road segment. These attributions can be used to define specific locations rending what traditionally has been considered a continuous road feature to a discrete road feature that can be used for localization, map building, and map healing.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for providing advanced driver assistance features which may include a navigation system user interface. For example, the computing device may be an Advanced Driver Assistance System module (ADAS) which may at least partially control autonomous or semi-autonomous features of a vehicle. However, as embodiments described herein may optionally be used for map generation, map updating, and map accuracy confirmation, embodiments of the apparatus may be embodied or partially embodied as a mobile terminal, such as a personal digital assistant (PDA), mobile telephone, smart phone, personal navigation device, smart watch, tablet computer, camera or any combination of the aforementioned and other types of voice and text communications systems. In a preferred embodiment where some level of vehicle autonomy is involved, the apparatus 20 is embodied or partially embodied by an electronic control unit of a vehicle that supports safety-critical systems such as the powertrain (engine, transmission, electric drive motors, etc.), steering (e.g., steering assist or steer-by-wire), and braking (e.g., brake assist or brake-by-wire). Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped or associated, e.g., in communication, with any number of sensors 21, such as a global positioning system (GPS), accelerometer, an image sensor, LiDAR, radar, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, a processor 24, a memory 26 and a user interface 28. In some embodiments, the processor (and/or co-processors or any other processing circuitry assisting or otherwise associated with the processor) may be in communication with the memory via a bus for passing information among components of the apparatus. The memory may be non-transitory and may include, for example, one or more volatile and/or non-volatile memories. In other words, for example, the memory may be an electronic storage device (for example, a computer readable storage medium) comprising gates configured to store data (for example, bits) that may be retrievable by a machine (for example, a computing device like the processor). The memory may be configured to store information, data, content, applications, instructions, or the like for enabling the apparatus to carry out various functions in accordance with an example embodiment of the present invention. For example, the memory could be configured to buffer input data for processing by the processor. Additionally or alternatively, the memory could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory 26, and/or the like).

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication and/or may alternatively support vehicle to vehicle or vehicle to infrastructure wireless links.

The apparatus 20 may support a mapping or navigation application so as to present maps or otherwise provide navigation or driver assistance. For example, the apparatus 20 may provide for display of a map and/or instructions for following a route within a network of roads via user interface 28. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LiDAR, ultrasonic and/or infrared sensors.

In example embodiments, a navigation system user interface may be provided to provide driver assistance to a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, automatic brake engagement, or the like. Identifying objects along road segments or road links that a vehicle may traverse may provide information useful to navigation and autonomous or semi-autonomous vehicle control by establishing barriers defining roadway width, identifying roadway curvature, identifying objects (continuous and discrete) or any boundary related details of the road links that may be traversed by the vehicle.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may be, for example, the apparatus 20 of FIG. 2, such as a mobile phone, an in-vehicle navigation system, an ADAS, or the like, and a map data service provider 108 or cloud service. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device 104, as they travel the roads throughout a region.

The map database 110 may be a master map database, such as an HD map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate or complementary embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments.

The map database 110 of example embodiments may be generated from a plurality of different sources of data. For example, municipalities or transportation departments may provide map data relating to roadways, while geographic information survey systems may provide information regarding property and ownership of property within a geographic region. Further, data may be received identifying businesses at property locations and information related to the businesses such as hours of operation, services or products provided, contact information for the business, etc. Additional data may be stored in the map database such as traffic information, routing information, etc. This data may supplement the HD map data that provides an accurate depiction of a network of roads in the geographic region in a high level of detail including road geometries, features along the roads such as signs, poles, lane lines, curbing, etc. The data stored in the map database may be gathered from multiple different sources, and one source of data that may help keep the data in the map database fresh is map data provided by vehicles traveling along the road segments of the road network.

While municipalities and businesses may provide map data to a map database, this data may not be up-to-date, may be incomplete, or may be inaccurate. The ubiquity with which vehicles travel along road segments render those vehicles as opportunities to collect data related to the road segments provided the vehicles are equipped with some degree of sensor technology. A vehicle traveling along a road segment with only location sensing technology, such as a Global Navigation Satellite System like GPS, Galileo, etc., may provide data relating to the path of a road segment, while vehicles with more technologically advanced sensors may be able to provide additional information. Sensor data from image sensors or depth sensors such as LiDAR may provide details regarding the features of road segments including the position of signs along the road segment and the information contained on the signs. Further, these sensors can identify lane lines of a road segment as they travel along the road segment. This data may be crowd sourced by map data service providers 108 to build more robust and reliable maps with a greater level of detail than previously available. Further, beyond building the maps in the map database 110, sensor data may be used to update map data or confirm existing map data to ensure the map database 110 is maintained and as up-to-date as possible. The accuracy and freshness of map data may be critical as vehicles become more advanced and autonomous control of vehicles becomes more ubiquitous as the map database 110 may provide information that facilitates control of a vehicle along a road segment.

Autonomous driving has become a focus of recent technology with recent advances in machine learning, computer vision, and computing power able to conduct real-time mapping and sensing of a vehicle's environment. Such an understanding of the environment enables autonomous driving in two distinct ways. Primarily, real-time sensing of the environment may provide information about potential obstacles, the behavior of others on the roadway, road information/warning signs, and areas that are navigable by the vehicle. An understanding of where other cars are and what they may do is critical for a vehicle (or apparatus 20) to safely plan a route. Further, vehicles must be able to avoid both static and dynamic obstacles, which may change presence and position in real-time. Autonomous vehicles must also have a semantic understanding of what areas are around them that are navigable and safe for driving. Maps, such as HD maps described above, of areas may exist with very high levels of granularity to help facilitate navigation for autonomous vehicles; however, exceptions will occur in which a vehicle may need to deviate from a roadway to avoid a collision or where a road's geometry or other map attributes (e.g., direction) have changed.

Another key to autonomous driving are vision techniques for localization with respect to a map of reference landmarks. This enables the understanding of a position and heading with respect to a roadway. On a coarse scale, navigation maps allow vehicles to know what roads to use to reach a particular destination. On a finer scale, maps allow vehicles to know what lanes to be in and when to make lane changes. This information is essential for planning an efficient and safe route as driving involves complex situations and maneuvers which need to be executed in a timely fashion, and often before they are visually obvious (e.g., a vehicle around a corner is stopped). Localization with respect to a map enables the incorporation of other real-time information into route planning. Such information can include traffic, areas with unsafe driving conditions (e.g., ice, weather, potholes, etc.) and temporary road changes, such as may be caused by construction.

While discrete objects within an environment are particularly beneficial for localization and map building/healing, continuous objects have conventionally been relegated to establishing a position relative to a road segment along its width and not for absolute localization. Embodiments described herein ascribe attributes to continuous objects to render the continuous objects useful as discrete objects.

Solid and dashed lane boundary markings as continuous objects can be detected by a vehicle traveling along a road segment through sensor data such as imagery. These markings are typically represented as continuous polylines or splines with a marking type classification (e.g., solid lines, dashed, short dash, alternate dash, etc.), but without information pertaining to dash end point locations or whether polyline vertices are on a painted line or within the unmarked interval between dashes. Aligning and merging detections from multiple drives or sources for map making is ambiguous and challenging where there is a lack of longitudinal constraint (e.g. discrete objects). The identification of continuous objects generally provides latitudinal position across a width of a road segment, but generally cannot provide longitudinal position along a length of the road segment. Embodiments described herein use endpoints of dashed markings to provide a longitudinal constraint in a novel and unique manner. Localization in the form of estimating the precise position of a vehicle in a map using sensor data measurements, is challenging in places that lack discrete features, such as long stretches of highways or rural roads. Embodiments described herein improve localization in such places lacking discrete objects in the environment.

Embodiments described herein go beyond identifying continuous objects in an environment without attribution, but ascribe attributes that render the continuous objects useful as having discrete features that are employed in localization and map building/healing. Lane lines, including dashed lines and lines occasionally broken (e.g., at intersections) are considered continuous objects in map development. Regardless of the type of lane line, they are represented in map data as continuous polylines which may have one or more lane line properties ascribed to them, such as solid, dashed, yellow, white, etc. The polylines may be two-dimensional, such as those illustrated in FIG. 3, or three-dimensional that can include an elevation, for example. The vertices of these continuous polylines do not necessarily fall in a dashed portion of a dashed lane line, and may fall between dashes. Arbitrary positioning of polyline vertices renders the underlying lane line useful only for latitudinal positioning along a width of a road segment.

Sensor data gathered by vehicles traveling along a road segment can be used to further define continuous objects to give them value as discrete objects. According to an example embodiment, a vehicle travels along a road segment with sensor data capturing road objects and features along the path of the vehicle. Continuous objects identified in the sensor data are given attributes and stored with their respective attributes. The attributes ascribed to lane lines identified in the sensor data include: at the beginning of a painted marking (e.g., a dash) with respect to the direction of travel; on a painted marking; at the end of a painted marking with respect to the direction of travel; and between paint markings. The attribute of "on a painted marking" indicates that the observation was captured on the visible, painted marking, whereas the attribute of "between lane paint markings" or between the lane line markings indicates that the observation was captured on the same logical lane marking between dash elements or other breaks in the marking. The "between lane paint markings" is thus identified along a polyline including the paint markings of a continuous lane line, though a continuous lane line can include dashed lines. Between lane paint markings does not include observations between two different continuous lane line markings (e.g., in the middle of a lane). This attribution can be added to sensor data collected such that attributes are stored with observations of lane markings at defined, discrete positions.

The attribution is determined based on gathered sensor data and associated with a specific location. For a vehicle traveling along a road segment, observations of lane marking vertices can be grouped for those that are on a paint marking for a single drive during the ingestion/processing to determine the aforementioned attributes. Sensor data gathered provides vertices on a polyline that are found on painted lines. These observations are grouped for each paint marking to understand where the dashes are present within a dashed lane line. While embodiments are described with respect to dashed lines that have regularly spaced paint markings, embodiments can be employed with any lane markings that have any form of discontinuity, such as continuous lines broken only by intersections, irregularly spaced lane markings, or the like.

Sensor data from a single drive that provides vertices on a polyline that are only attributed with being on a lane marking may be grouped into a single marking, provided they are close enough together. Gaps can be estimated between these groups of markings, and estimates of end points of the lane markings may be established based on the observations grouped into teach marking. If there is a relatively large gap between observations of a lane line marking, it can be presumed that a new lane line marking is beginning.

The sensor data gathered from a single drive can be aggregated with a plurality of drives localized using any available localization techniques and clustered to form clustered observations of lane marking vertices that are on a paint marking together with their ascribed attributes. These clustered observations can improve accuracy and reliability of the observed lane marking along with the attributes thereof.

FIG. 3 illustrates an example embodiment of a road segment 200 including continuous objects in the form of lane lines and a discrete object 202 in the form of a stop sign. As shown, the road segment 200 includes a solid lane line 204 extending substantially unbroken along a left side of the roadway relative to the direction of travel along arrow 206. A dashed lane line includes dashes 208, while a right-side lane line 210 is broken at an intersection with road segment 224. Observations within sensor data of the beginning of a lane line dash marking with respect to the direction of travel is shown at location 212. The location 212 is defined in terms of a geographic location (e.g., latitude and longitude in terms of geographic parallels and meridians, or in some other form of geo-referenced defined location) and ascribed an attribution. In the case of location 212, that attribution is the beginning of a lane line marking.

Another point 214 is identified in sensor data as an end of a lane line marking. This point is ascribed the attribution of the end of a lane line marking. A point 220 identified as a lane line marking that is neither a beginning or end of the lane line marking is ascribed the attribution of being on a paint marking. Similarly, point 216 is observed within sensor data as being the end of a lane line marking, despite not being related to a dashed line, but nonetheless is an identifiable discontinuity in the lane line 210. Point 218 on the far side of the intersection with road segment 224 is identified as the beginning of a painted marking. FIG. 4 illustrates a table of the observations from sensor data depicted in FIG. 3 along with their geographical locations and attribution information.

Knowing the end points of lane line markings provides distinct advantages. Vehicle localization can use lane line marking end points as a longitudinal constraint allowing improved location estimation along aa roadway even in the absence of other discrete objects such as signs and poles. When aggregating multiple drives for map creation and maintenance, the additional constraint of the lane line marking end points makes association easier between observed data and map data by providing a longitudinal constraint, particularly on straight roads.

When detection and classification is done onboard a vehicle or within a mobile device, specific endpoints can be selected to be vertices of the output polyline, further improving longitudinal accuracy along a road segment. Not all endpoints (beginning or end) of lane lines must be represented, particularly when fine-dashed lines exist. A balance may be reached between the number of points needed for accurate localization and to keep data size within reason. The volume of data used for the lane line markings can further be metered based upon context of the lane lines. For example, for a long, straight road the number of lane line marking points identified with attribution may be relatively lower than along a road segment that is not straight, or that includes an intersection or other road feature of significance to vehicle control and navigation. For example, a long, straight road having a dashed lane line marking boundary may not require a large volume of points defined longitudinally along the road, but may use beginning and ending points of lane line dashes rather than a large volume of points between the beginnings and endings of the lane line dashes. Such pruning of data points can reduce the bandwidth needed for sending/receiving map data points for localization and map building. This may represent the minimal set of vertices needed to accurately represent the polyline.

The output of example embodiments described herein can include a polyline representing lane line markings with specific, known vertices with defined locations. This renders a continuous object appropriate for accurate localization and map building/healing. The principle described herein applies to any markings along a road segment, and can be implemented with any continuous features of a road segment. For example, curbing, guard rails, etc.

Paint markings may change along a road segment. Embodiments described herein can capture these changes through detection of paint marking endpoints and determining when disagreement exists between sensor collected observations and the map data. Some contextual clues may provide an indication of a potentially reduced reliability of paint marking end points, such as road construction indications (e.g., via municipal data feed, sign detection, etc.) that may reflect some form of traffic shift, repaving, repainting, etc. When the context of a road segment indicates construction may be present or lane lines may be unreliable, the lane line marking end points may still be detected, but may not be relied upon until confirmed between sensor observations and map data.

Localization using sensor detected end points of lane line markings relies upon accurate map data including known locations of such end points. The generation of this map data and the updating of such map data can be performed based on observation data from vehicles traveling among a road network. However, the reliability of data from different sources may be considered when determining whether to update map data. For example, crowd-sourced information from OEM vehicles traveling within a road network may be moderately reliable. Receiving a plurality of drives observing the same lane line marking end points at the same locations can increase the reliability of the data to a point where confidence is sufficiently high to update the map data. Alternatively, specially equipped vehicles with a high level of sensor capacity and accuracy can be deemed reliable and substantially ground truth, such that only a single drive by such a vehicle can be used to build or update map data.

Updates and changes to map data, and particularly to the end points of lane line markings can be subject to a threshold number of observations before a change to the map data is implemented. A lane line may deteriorate in quality through wear, may be moved through construction, or may be otherwise changed. While a single observation of such a change may not be considered significant, if observations consistently indicate the change, the sensor data may be deemed reliable and used to update the map data.

As described above, HD maps may be instrumental in facilitating autonomous vehicle control. Building the HD maps may rely on, among other information, sensor data received from crowd sourced detectors including image sensors and depth detectors (e.g., LiDAR, Mobileye, etc.) from vehicles traveling along the network of roads that is mapped. The sensor data that is received is processed to identify objects and features in the sensor data to properly build and update the HD maps, and to facilitate autonomous control of the vehicle generating the sensed data. Embodiments described herein provide a method for identifying discrete features of continuous objects detected in the sensor data to function as discrete objects for localization and map building.

According to example embodiments described herein, the role of HD maps in facilitating autonomous or semi-autonomous vehicle control may include crowd-sourced building of the maps to identify and confirm features of the maps and their respective locations. In the context of map-making, the features from the environment may be detected by a vehicle traveling along a road segment and consolidated to form a representation of the actual real-world environment in the form of a map. Embodiments described herein include a method, apparatus, and computer program product to greatly enhance the discrete object identification through using discrete elements of continuous objects to increase the data points through which localization and map building can be performed.

FIG. 5 illustrates an example embodiment of architecture specifically configured for implementing embodiments described herein. The illustrated embodiment of FIG. 5 may be vehicle-based, where sensor data is obtained from sensors of a vehicle traveling along a road segment. The location of the collected sensor data along the road segment may be determined through location determination using GPS or other positioning means and correlated to map data of map data service provider 108. As illustrated, the architecture includes a map data service provider 108 that provides map data (e.g., HD maps and policies 325 associated with road links within the map) to the Advanced Driver Assistance System (ADAS) 305, which may be vehicle-based or server based depending upon the application. The map data service provider may be a cloud-based 310 service. The ADAS receives navigation information and vehicle position and may use that information to map-match 315 the position to a road link on a map of the mapped network of roads stored in the map cache 320 or ADAS map database 330. This link or segment, along with the direction of travel, may be used to establish which HD map policies are applicable to the vehicle associated with the ADAS, including sensor capability information, autonomous functionality information, etc. Accordingly, policies for the vehicle are established based on the current location and the environmental conditions (e.g., traffic, time of day, weather). The HD map policies associated with the road segment specific to the vehicle are provided to the vehicle control, such as via the CAN (computer area network) BUS (or Ethernet or Flexray) 340 to the electronic control unit (ECU) 345 of the vehicle to implement HD map policies, such as various forms of autonomous or assisted driving, or navigation assistance.

A vehicle traveling along a road segment may receive sensor data from a plurality of sensors used to capture data relating to the surrounding environment, such as the position of an object (e.g., a sign, pole, lane markings, lane marking end points etc.) relative to a vehicle and the road segment. These geospatial observations may be generated along discrete trajectories that are aligned and used to definitively identify the geo-location of objects such as discrete points along lane line markings within a map database. The automatic building and updating of map geometries as described herein can produce accurate HD maps with great efficiency.

FIG. 6 illustrates a flowchart depicting a method according to an example embodiment of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

As shown in FIG. 6, a sequence of geospatial observations are received from a vehicle traveling along a road segment at 410. Within the sequence of geospatial observations, lane line marking observations are identified at 420. From the lane line marking observations, discrete points are determined at 430 along lane line markings. A location of the vehicle is established at 440 based, at least in part, on the discrete points along the lane line markings. At least one of navigational assistance or at least semi-autonomous vehicle control is provided for based on the location established at 450.

In an example embodiment, an apparatus for performing the method of FIG. 6 above may comprise a processor (e.g., the processor 24) configured to perform some or each of the operations (410-450) described above. The processor may, for example, be configured to perform the operations (410-450) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 410-450 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
   receive a sequence of geospatial observations as sensor data from a vehicle traveling along a road segment;
   identify, within the sequence of geospatial observations, lane line marking observations;
   ascribe attributes to each of the lane line marking observations, wherein the attributes comprise: beginning of lane line marking, end of lane line marking, on a lane line marking, and between lane line markings, wherein the attributes are added to the sensor data and the attributes are stored with the lane line marking observations;
   determine, from the lane line marking observations, discrete points along lane line markings, wherein the discrete points along the lane line markings each comprise at least one of the attributes;
   establish a location of the vehicle based, at least in part, on the discrete points along the lane line markings and the attributes thereof; and
   provide for at least one of navigational assistance or at least semi-autonomous vehicle control based on the location established.

2. The apparatus of claim 1, wherein the attributes of the beginning of the lane line marking and the end of the lane line marking are relative to a direction of travel of the vehicle.

3. The apparatus of claim 1, wherein the sequence of geospatial observations comprises a sequence of geo-referenced images from an image sensor.

4. The apparatus of claim 1, wherein the apparatus is further caused to provide an indication of the discrete points along lane line markings to a map services provider for use in map generation and map updating.

5. The apparatus of claim 1, wherein the apparatus is further caused to generate a polyline extending along a lane line marking, wherein discrete points along the lane line marking are used as vertices of the polyline.

6. The apparatus of claim 1, wherein the apparatus is further caused to:
   determine that at least some of the discrete points along the lane line markings fail to correspond with map data identifying the discrete points along the lane line markings; and
   provide an update to the map data to a map services provider in response to the at least some of the discrete points along the lane line markings failing to correspond with map data identifying the discrete points along the lane line markings.

7. The apparatus of claim 1, wherein the lane line marking observations having an attribute of between lane line markings indicates that the lane line marking observations are along a polyline through and between at least two dashed lane line markings.

8. A computer program product comprising at least one non-transitory computer-readable storage medium having computer-executable program code instructions stored therein, the computer-executable program code instructions comprising program code instructions to:

receive a plurality of sequences of geospatial observations as sensor data from vehicles traveling along a road segment;

identify, within the plurality of sequences of geospatial observations, lane line marking observations;

ascribe attributes to each of the lane line marking observations, wherein the attributes comprise: beginning of lane line marking, end of lane line marking, on a lane line marking, and between lane line markings, wherein the attributes are added to the sensor data and the attributes are stored with the lane line marking observations;

determine, from the lane line marking observations, discrete points along lane line markings, wherein the discrete points along the lane line markings each comprise at least one of the attributes;

generate a polyline along the road segment based on the lane line marking observations;

update a map of a map database with the polyline representing the lane line marking observations including the discrete points along the lane line markings and the attributes thereof; and provide the discrete points along the lane line markings and the attributes thereof for localization of a vehicle traveling along the road segment.

9. The computer program product of claim 8, the discrete points along the lane line markings are vertices of the polyline.

10. The computer program product of claim 8, wherein the attributes of the beginning of the lane line marking and the end of the lane line marking are relative to a direction of travel of the vehicles traveling along the road segment.

11. The computer program product of claim 8, wherein the plurality of sequences of geospatial observations comprise sequences of geo-referenced images from image sensors.

12. The computer program product of claim 8, further comprising program code instructions to provide an indication of the discrete points along lane line markings to a vehicle traveling along the road segment for at least one of navigational assistance or at least semi-autonomous vehicle control.

13. The computer program product of claim 8, wherein the lane line marking observations having an attribute of between lane line markings indicates that the lane line marking observations are along a polyline through and between at least two dashed lane line markings.

14. A method comprising:

receiving a sequence of geospatial observations as sensor data from a vehicle traveling along a road segment;

identifying, within the sequence of geospatial observations, lane line marking observations;

ascribing attributes to each of the lane line marking observations, wherein the attributes comprise: beginning of lane line marking, end of lane line marking, on a lane line marking, and between lane line markings, wherein the attributes are added to the sensor data and the attributes are stored with the lane line marking observations;

determining, from the lane line marking observations, discrete points along lane line markings, wherein the discrete points along the lane line markings each comprise at least one of the attributes;

establishing a location of the vehicle based, at least in part, on the discrete points along the lane line markings and the attributes thereof; and providing for at least one of navigational assistance or at least semi-autonomous vehicle control based on the location established.

15. The method of claim 14, wherein the attributes of the beginning of the lane line marking and the end of the lane line marking are relative to a direction of travel of the vehicle.

16. The method of claim 14, wherein the sequence of geospatial observations comprises a sequence of geo-referenced images from an image sensor.

17. The method of claim 14, further comprising providing an indication of the discrete points along lane line markings to a map services provider for use in map generation and map updating.

18. The method of claim 14, further comprising generating a polyline extending along a lane line marking, wherein discrete points along the lane line marking are used as vertices of the polyline.

19. The method of claim 14, further comprising:

determining that at least some of the discrete points along the lane line markings fail to correspond with map data identifying the discrete points along the lane line markings; and providing an update to the map data to a map services provider in response to the at least some of the discrete points along the lane line markings failing to correspond with map data identifying the discrete points along the lane line markings.

20. The method of claim 14, wherein the lane line marking observations having an attribute of between lane line markings indicates that the lane line marking observations are along a polyline through and between at least two dashed lane line markings.

* * * * *

UNITED STATES PATENT AND TRADEMARK OFFICE
CERTIFICATE OF CORRECTION

| | | |
|---|---|---|
| PATENT NO. | : 12,447,954 B2 | Page 1 of 1 |
| APPLICATION NO. | : 18/045206 | |
| DATED | : October 21, 2025 | |
| INVENTOR(S) | : D. Scott Williamson | |

It is certified that error appears in the above-identified patent and that said Letters Patent is hereby corrected as shown below:

On the Title Page

Item (72), Inventor, Line 1, delete "D Scott Williamson" and insert -- D. Scott Williamson --, therefor.

Signed and Sealed this
Tenth Day of February, 2026

John A. Squires
*Director of the United States Patent and Trademark Office*